United States Patent
Richards et al.

(10) Patent No.: US 10,439,378 B2
(45) Date of Patent: Oct. 8, 2019

(54) POKE-THROUGH DEVICE

(71) Applicant: Thomas & Betts International LLC, Wilmington, DE (US)

(72) Inventors: Gregory Richards, Germantown, TN (US); Mark R. Drane, Germantown, TN (US); Robert Kevin Jolly, Cordova, TN (US); Michael D. Martin, Memphis, TN (US)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 16/015,695

(22) Filed: Jun. 22, 2018

(65) Prior Publication Data
US 2019/0006830 A1    Jan. 3, 2019

Related U.S. Application Data

(60) Provisional application No. 62/526,787, filed on Jun. 29, 2017.

(51) Int. Cl.
| | |
|---|---|
| *H02G 3/08* | (2006.01) |
| *E04B 1/94* | (2006.01) |

(Continued)

(52) U.S. Cl.
CPC ............. *H02G 3/088* (2013.01); *E04B 1/947* (2013.01); *H02G 3/081* (2013.01); *H02G 3/14* (2013.01); *H02G 3/185* (2013.01); *H02G 3/22* (2013.01)

(58) Field of Classification Search
CPC .......... H02G 3/088; H02G 3/081; H02G 3/14; H02G 3/185; H02G 3/22; H02G 3/0412;

(Continued)

(56) References Cited

U.S. PATENT DOCUMENTS

| | | | |
|---|---|---|---|
| 6,235,418 B1 * | 5/2001 | Pedicni ............... | H01M 2/0207 429/407 |
| 6,696,640 B1 * | 2/2004 | Castellani .............. | H02G 3/185 174/483 |

(Continued)

OTHER PUBLICATIONS

Canadian Intellectual Property Office, Requisition by the Examiner issued in corresponding Canadian application No. 3,009,555, dated Mar. 25, 2019, 5 pp.

*Primary Examiner* — Mandeep S Buttar
(74) *Attorney, Agent, or Firm* — Taft Stettinius & Hollister LLP; J. Bruce Schelkopf

(57) ABSTRACT

A poke-through device for installation in a hole in a floor structure, the poke-through device including a body defining an interior. The body including a length bounded by an upper end and a lower end, the body including a central axis extending along its length. A mounting frame including a pair of opposed end lobes separated by at least one divider. One of the pair of lobes has a first electrical device mounting surface and the other of the pair of lobes including a second electrical device mounting surface. The first and second electrical mounting surfaces are angled toward the central axis. The first and second electrical device mounting surfaces each including an opening adapted to receive therein an electrical device. A first intumescent member is disposed at the body upper end, and an electrical box is secured to the body lower end. A fire resistant gasket is disposed between the electrical box and the body lower end. The gasket includes openings therein to permit passage of wiring between the electrical box and the body.

24 Claims, 20 Drawing Sheets

(51) Int. Cl.
*H02G 3/18* (2006.01)
*H02G 3/14* (2006.01)
*H02G 3/22* (2006.01)

(58) Field of Classification Search
CPC ............ H02G 3/12; H02G 3/08; H02G 15/10;
H02G 3/085; H02G 3/0418; H02G 3/283;
E04B 1/947; E04B 1/948; E04B 2/7411;
E04B 1/946
USPC .............................. 361/622; 174/535, 483, 50
See application file for complete search history.

(56) References Cited

U.S. PATENT DOCUMENTS

| | | | |
|---|---|---|---|
| 7,511,231 B2 * | 3/2009 | Drane | H02G 3/185 174/482 |
| 7,569,776 B2 | 8/2009 | Jolly et al. | |
| 2002/0157324 A1 * | 10/2002 | Newbold | F21S 8/02 52/27 |
| 2008/0264665 A1 * | 10/2008 | Jolly | H02G 3/185 174/50 |
| 2013/0192869 A1 * | 8/2013 | Drane | H02G 3/185 174/67 |
| 2013/0307225 A1 * | 11/2013 | Boyd | F16L 5/04 277/615 |
| 2014/0131088 A1 * | 5/2014 | Drane | H02G 3/185 174/483 |

* cited by examiner

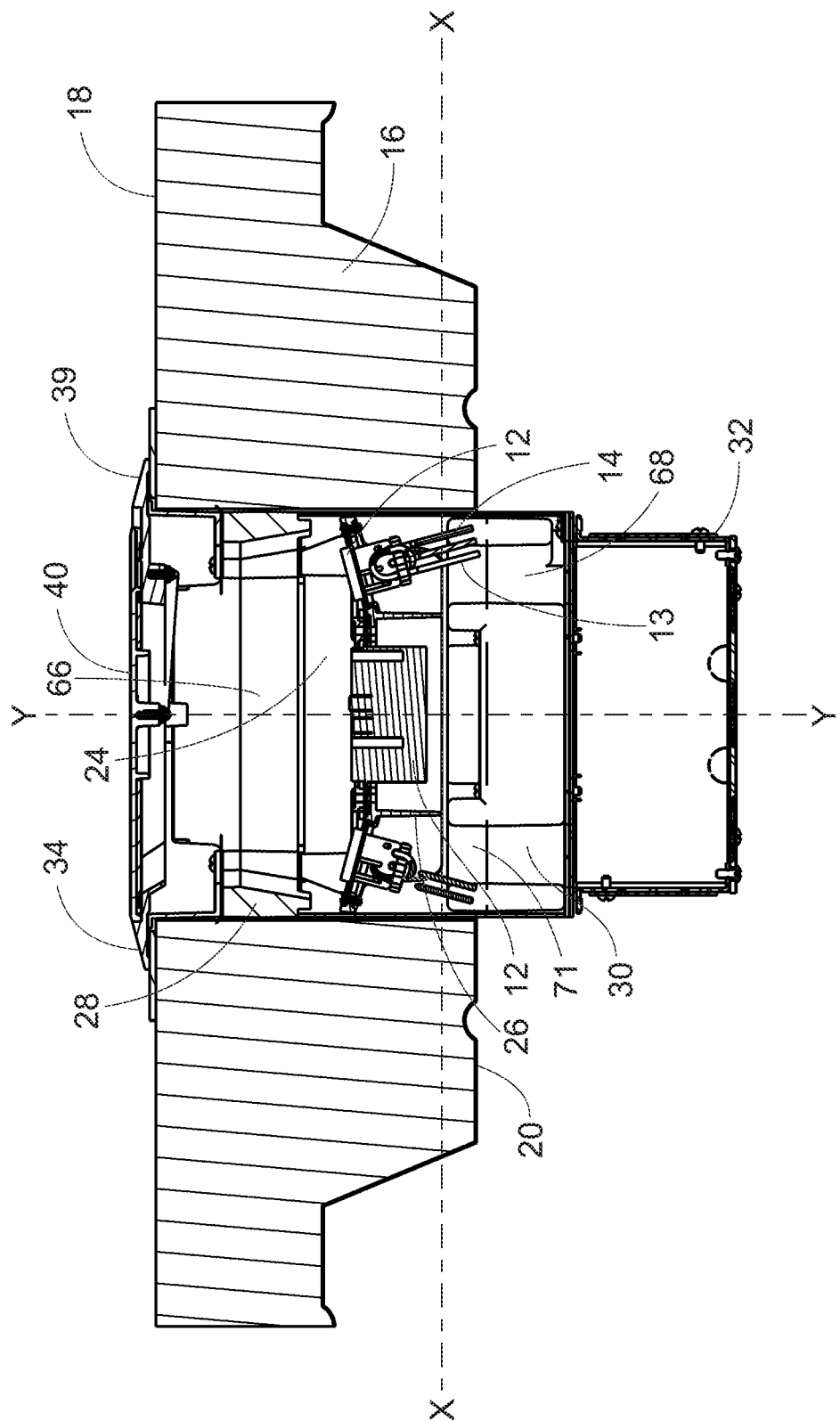

POKE-THROUGH DEVICE

The present application claims the benefit of priority to U.S. Provisional Patent Application Ser. No. 62/526,787 filed on Jun. 29, 2017, the entire contents of which are incorporated by reference herein.

FIELD OF TECHNOLOGY

The present disclosure relates generally to electrical connections and enclosures. More particularly, the disclosure relates to a fire resistant poke-through device.

BACKGROUND

Much activity has been devoted to avoiding the necessity of using on-floor conduits for conveying electrical power and communication lines to floor locations which were not within the original architectural and electrical planning of a facility, such as a multi-floor concrete building. On-floor conduits are unsightly and may also pose a safety hazard to persons working in such an area.

One technique for avoiding the use of on-floor conduits involves the drilling of a hole through the concrete floor at a desired location and the routing of power or communication lines beneath the floor and then up through the hole. Transition apparatus known as "poke-throughs" have been developed for use in such interfloor holes. Poke-throughs are subject to electrical and fire safety considerations. Among these considerations are two fire-related requirements. First, the poke-through cannot function as a chimney or fire-advancing flue in the event of a fire on the lower floor. Second, the poke-through cannot function as a floor-to-floor heat conduction path.

These safety requirements have largely been met through the use of intumescent material. For example, U.S. Pat. Nos. 5,003,127 and 5,107,072 disclose a poke-through assembly wherein a sheet of intumescent material is wired in place about a housing, and expands to fill and to block the interfloor hole in the event of fire. Furthermore, thermally insulating materials have been interposed between metallic (and therefore heat conductive) portions of the poke-through devices. Thus, poke-through devices have come into common use.

With greater use of poke-through devices, there is interest in making their manufacturing economical, their installation easier and faster, and their retention more positive. The United States Patent of James H. Whitehead, entitled "Poke-Through Electrical Connection Assembly Retainer," U.S. Pat. No. 5,641,940, presents a solution to the problems of rapid installation, positive retention, and economical manufacturing. The '940 patent discloses a self-anchoring poke-through electrical connection assembly retainer, as well as a pre-formed intumescent material structure which is easy to apply during the manufacturing process.

However, problems still remain with the use of poke-through devices. One such problem involves ensuring that the intumescent material expands to completely fill and maintain a filled state long enough for the unit to meet applicable fire safety standards. Retaining the intumescent material in the poke-through under fire conditions has also proved challenging.

Accordingly, it would be desirable to provide a poke-through device that under fire conditions retains the intumescent material and permits the intumescent material to completely fill the poke-through.

SUMMARY

The present disclosure provides a poke-through device for installation in a hole in a floor structure, the poke-through device including a body defining an interior. The body including a length bounded by an upper end and a lower end, the body including a central axis extending along its length. A mounting frame including a pair of opposed end lobes separated by at least one divider. One of the pair of lobes has a first electrical device mounting surface and the other of the pair of lobes including a second electrical device mounting surface. The first and second electrical mounting surfaces are angled toward the central axis. The first and second electrical device mounting surfaces each including an opening adapted to receive therein an electrical device. A first intumescent member is disposed at the body upper end, and an electrical box is secured to the body lower end. A fire resistant gasket is disposed between the electrical box and the body lower end. The gasket includes openings therein to permit passage of wiring between the electrical box and the body.

The present disclosure also provides a poke-through device including a body defining a body interior and including a length bounded by an upper end and a lower end. The body has a central axis extending along its length. A mounting frame is disposed in the body and adapted to secure an electrical device within the body. A first intumescent member is disposed at the body upper end. A second intumescent member is disposed in the body between the mounting frame and the body lower end. A cover is secured to the upper end. The cover includes a frame defining an opening and a lid movable between an open and closed position wherein access to the body interior is provided when the lid is in the open position. The cover includes an electrical device access port adapted to receive an electrical device wherein the electrical device access port is exposed when the lid is in the closed position. An electrical box is secured to the body lower end.

The present disclosure still further provides a poke-through device including a body defining an interior and including an upper end and a lower end and including a central axis extending between the upper and lower end. A mounting frame includes a plurality of metallic mounting plates secured thereto adapted to secure an electrical device within the body. The mounting frame has a pair of opposed mounting surfaces adapted to support a first electrical device. The mounting surfaces being spaced apart by a divider. The divider forms an opening to receive a second electrical device. A plurality of metallic mounting plates is secured to the mounting frame. The plurality of mounting plates is adapted to secure the second electrical device to the mounting frame between the pair of mounting surfaces. The pair of mounting surfaces is angled toward the central axis. A first intumescent member is disposed on the body upper end. A second intumescent member is disposed in the body interior between the mounting frame and the body lower end. A metallic electrical box is secured to the body lower end. A fire resistant gasket is disposed between the electrical box and the body lower end, the gasket including slits therein to permit passage of wiring between the electrical box and the body and to retain the intumescent material in the body during a fire condition.

BRIEF DESCRIPTION OF THE DRAWINGS

FIG. 4 is a cross-sectional elevational view taken along line 2-2 of FIG. 1, showing the poke-through device mounted in a floor structure.

FIG. 13 is a partially exploded bottom perspective view of the poke-through.

DETAILED DESCRIPTION

Figure 1:
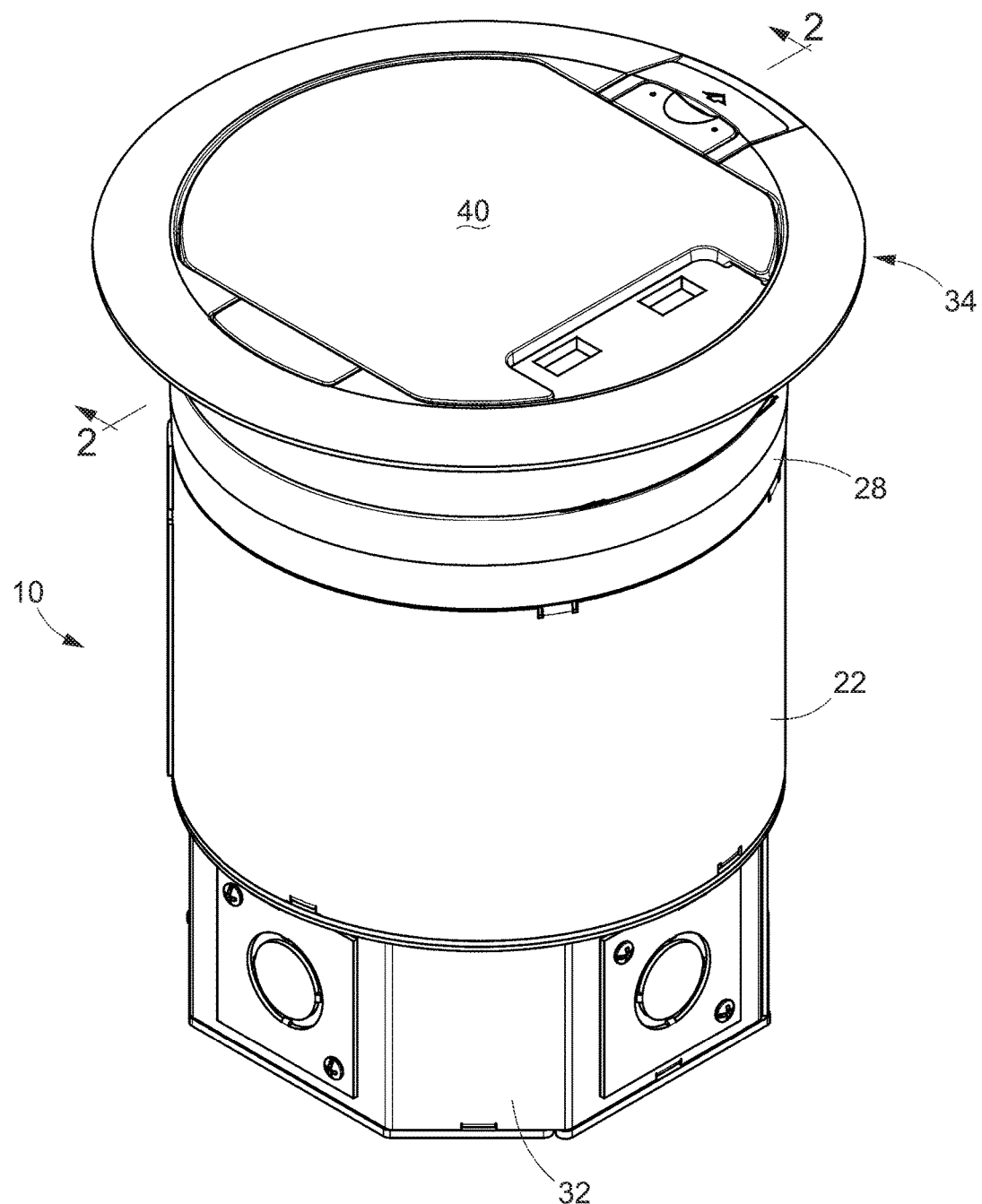
FIG. 1 is a perspective view of a poke-through device of the present disclosure.
Figure 2:
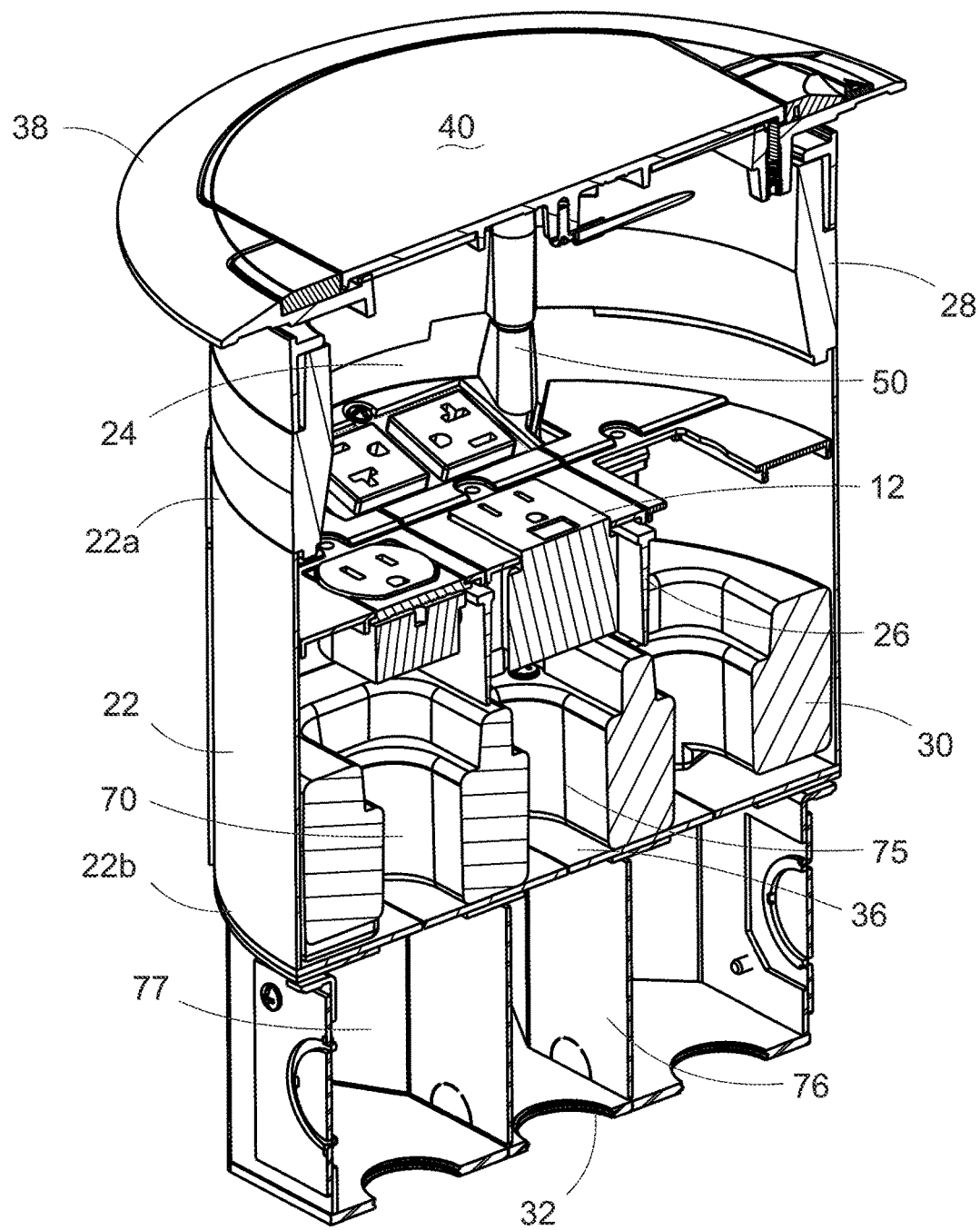
FIG. 2 is a cross-sectional perspective view taken along line 2-2 of FIG. 1.
Figure 3:
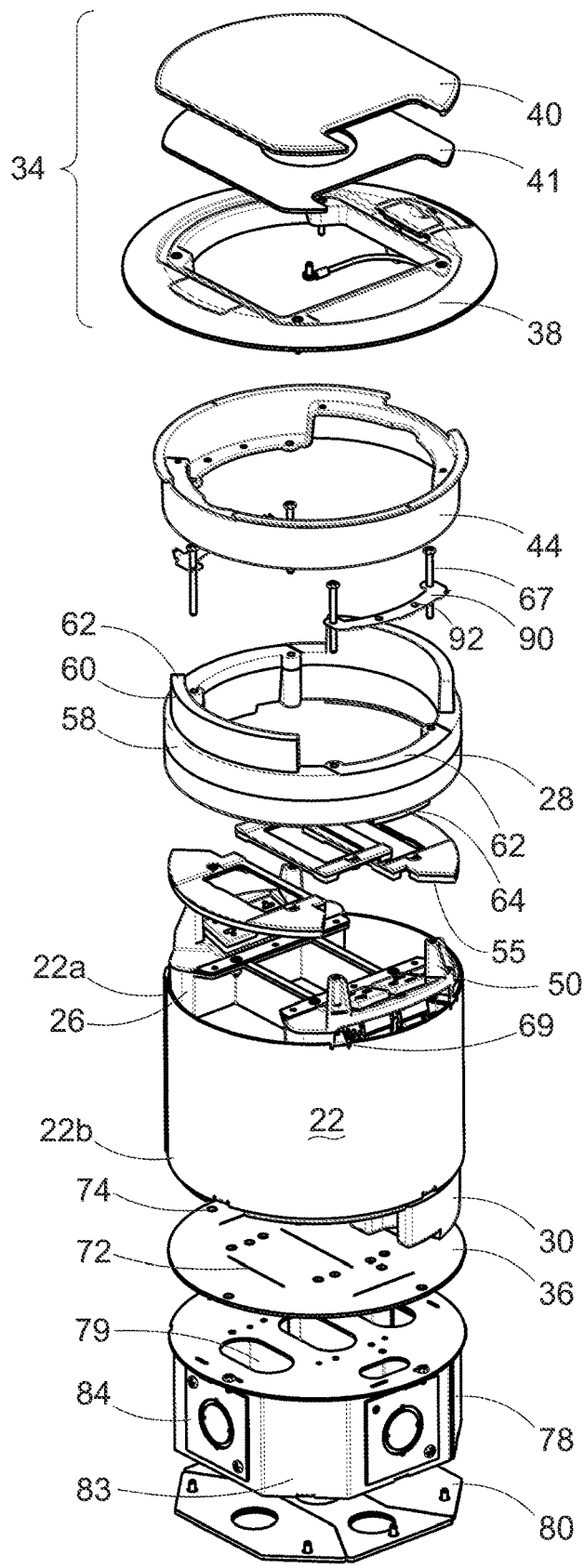
FIG. 3 is a perspective exploded view showing of the poke-through device.
Figure 4A:
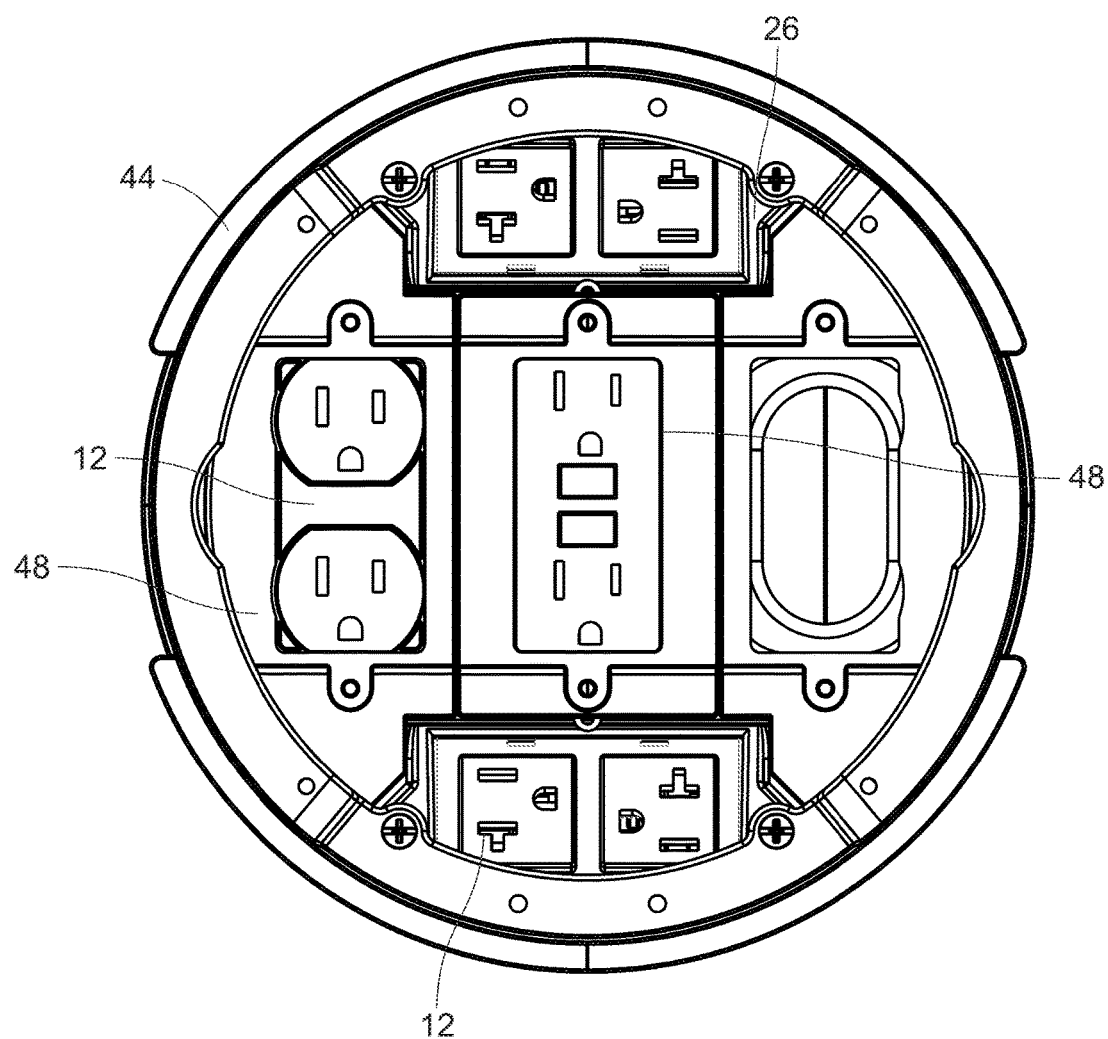
FIG. 4A is a top view of the poke-through with a cover assembly removed showing the electrical devices.

Referring initially to FIGS. 1-4A, a poke-through device, designated generally as 10, is sized and configured to provide a housing for one or more electrical devices 12 including electrical power receptacles and data connections. The poke-through device 10 is preferably for installation in an interfloor receiving hole 14 in a floor structure 16, and the floor structure defines a floor 18 in a first working environment and a ceiling 20 in a second working environment. The hole 14 communicates between the first and second working environments. In a preferred poke-through device 10 as shown in FIGS. 2 and 4, the electrical devices 12 connected to wiring 13 are recessed below a plane defining the surface of the floor 18. Although the present application refers generally to running of wiring, it is to be understood that data cables, fiber optic cables or similar structures are also within the scope of the disclosure.

Figure 7:
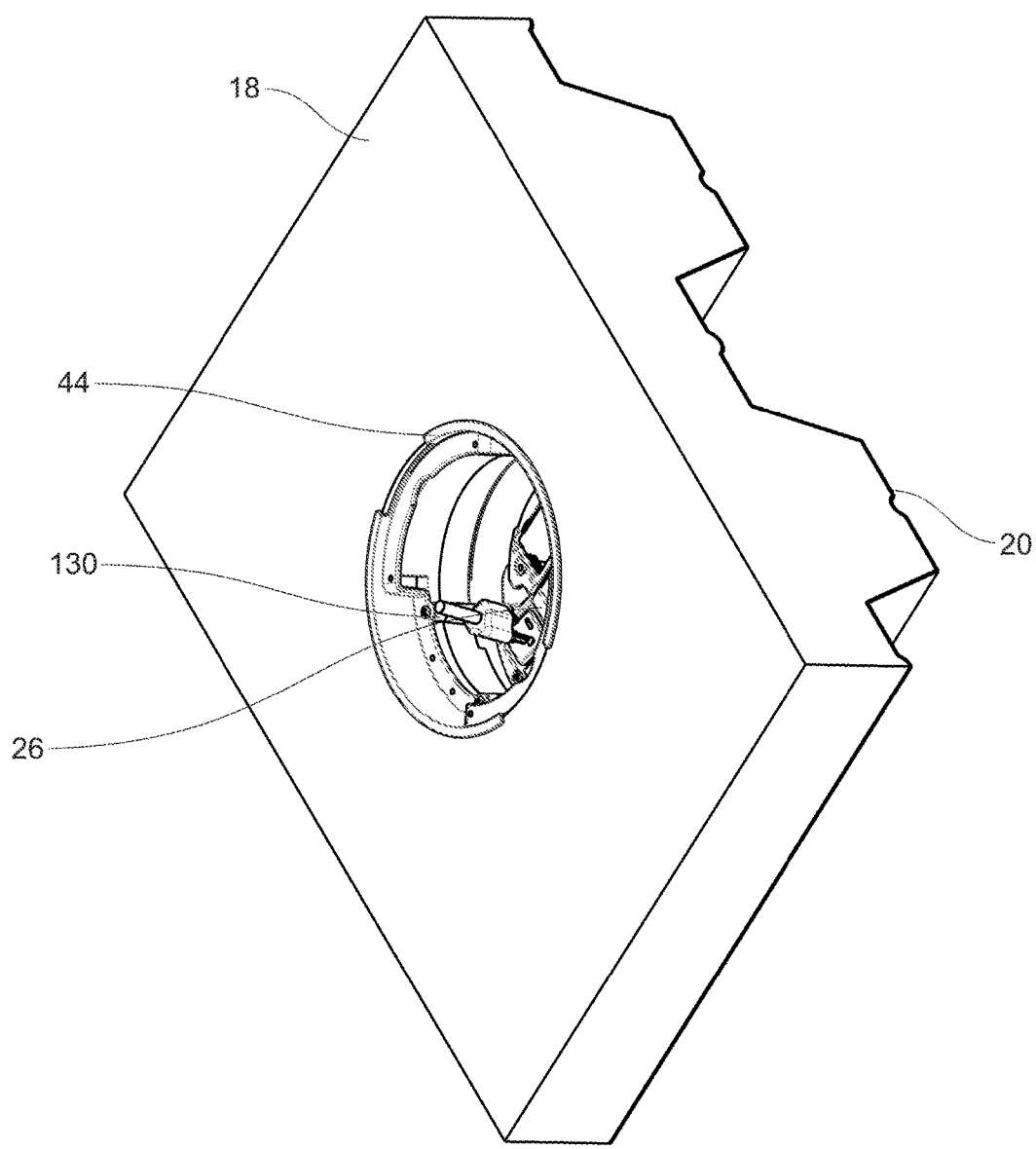
FIG. 7 is a top perspective view showing the poke-through device mounted in a floor structure with the cover assembly removed.
Figure 8:
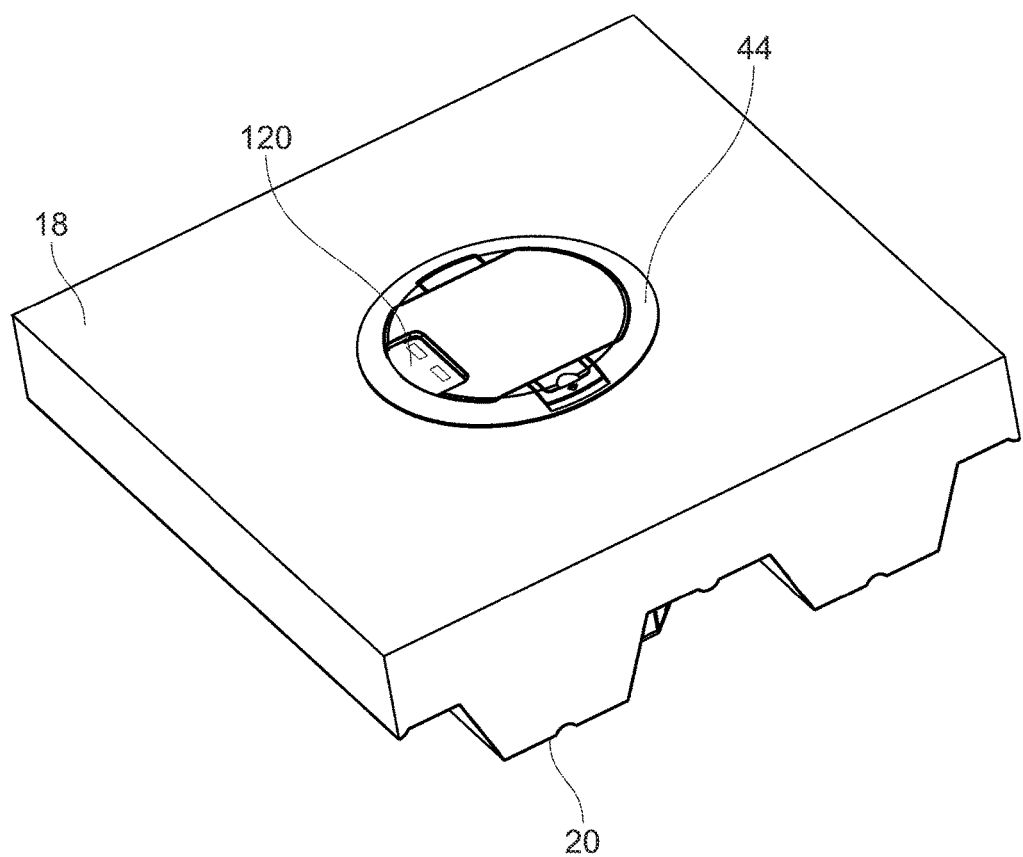
FIG. 8 is a top perspective view showing the poke-through device mounted in a floor structure with the cover assembly.
Figure 9:
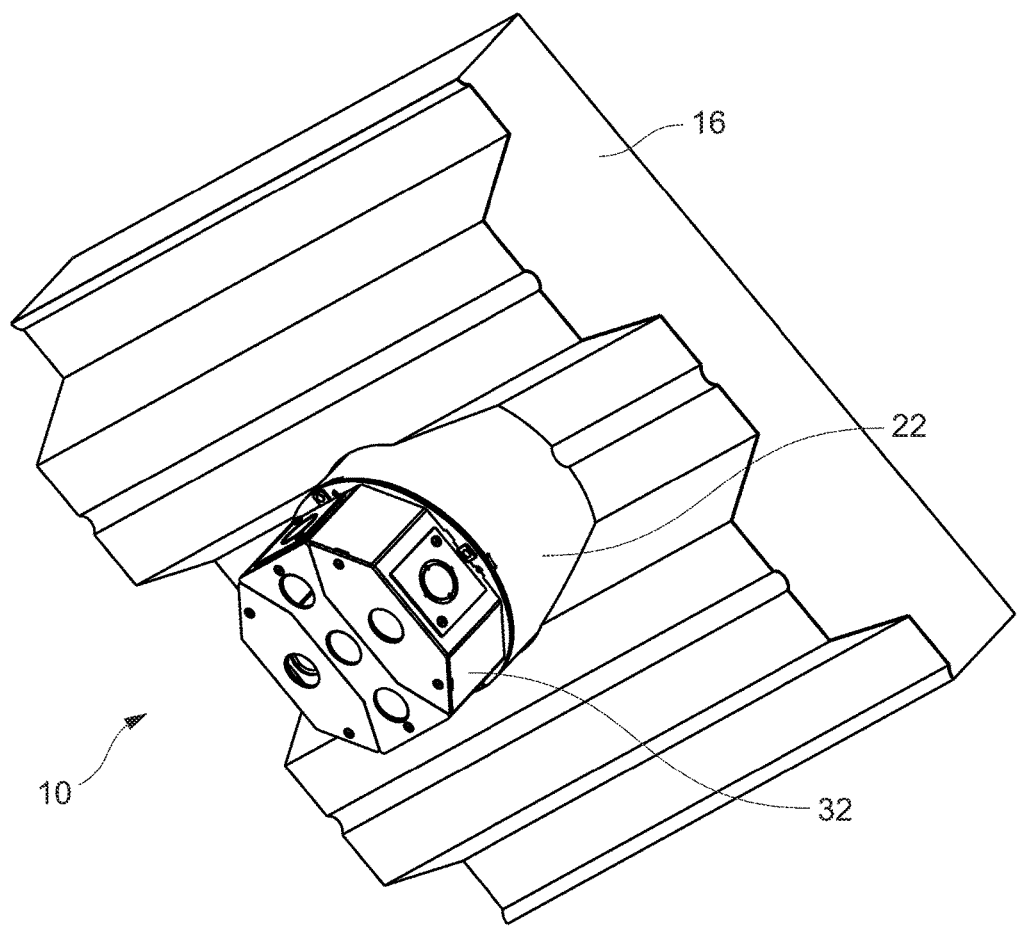
FIG. 9 is a bottom perspective view showing the poke-through device mounted in a floor structure.

As shown in FIGS. 7-9, poke-through device 10 is sized and configured for installation in a device-receiving hole 14 extending through a floor structure 16, typically formed of concrete. As will be appreciated by those skilled in the art, poke-throughs are used to add and/or supplement electrical power and data capability in existing buildings. Accordingly, the floor structures in question are not pre-built or pre-cast with underfloor passages for routing of wires. Thus, holes 14 may be drilled through existing floor structures 16 of existing buildings.

Referring to FIGS. 1-4, poke-through device 10 includes a tubular body 22 including an upper and lower end 22a and 22b. Body 22 may be formed of metal material for heat resistance. The body defines an interior 24 which contains therein a mounting frame 26 for supporting and securing electrical devices 12. The body 22 further includes thereon an upper intumescent member 28 disposed above the mounting frame 26. A lower intumescent member 30 is disposed within the body 22 below the mounting frame 26. The intumescent members 28 and 30 are made of an intumescent material that is initially rigid but will expand and flow upon being subjected to heat such as in a fire condition, thereby creating a fire stop. An electrical box 32 may be connected to the body lower end 22b, and a cover assembly 34 may be mounted to the body upper end 22a. The electrical box 32 may be in the form of a junction box. A fire barrier in the form of a fire resistant gasket 36 may be disposed between the electrical box 32 and the body 22 as shown in FIGS. 2 and 3.

With reference to FIGS. 3, 5, 5A, and 6, the cover assembly 34 may include frame 38 defining an opening 38a covered by a lid 40 secured to the frame 38 and moveable between an open and a closed position. The cover frame 38 may be secured to a collar 44 which is disposed adjacent to body upper end 22a. A resilient sealing member 41 may be retained on the undersurface of the lid 40 and engage a raised lip 41a on the cover frame 38 to prevent water from entering the opening 38a when the lid 40 is in the closed position. The lid 40 may be released form a closed position upon operation of a latch. The frame 38 and lid 40 may be formed of metal. The lid 40 provides selective access to the electrical devices 12 secured within the poke-through 10 as shown in FIG. 4A. A tether 40a may be connected to the lid 40 and frame 38 so that the lid can be moved to the open position but cannot be taken away from the frame. The frame 38 may have a tapered surface 39 to reduce tripping hazards as shown in FIG. 4. The cover assembly 34 may, for example, be of the type described in U.S. Pat. No. 8,357,852, or U.S. Pat. No. 8,921,695 both of which are incorporated by reference herein. However, it is to be understood that cover assemblies having different configurations may be used.

Figure 5:
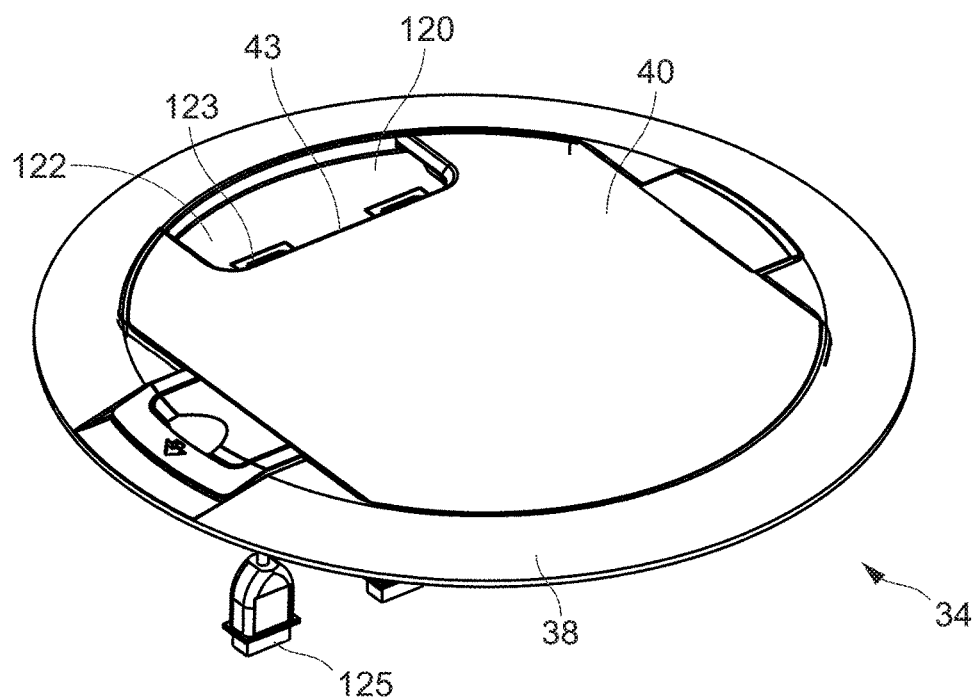
FIG. 5 is a top perspective view of a cover assembly.
Figure 5A:
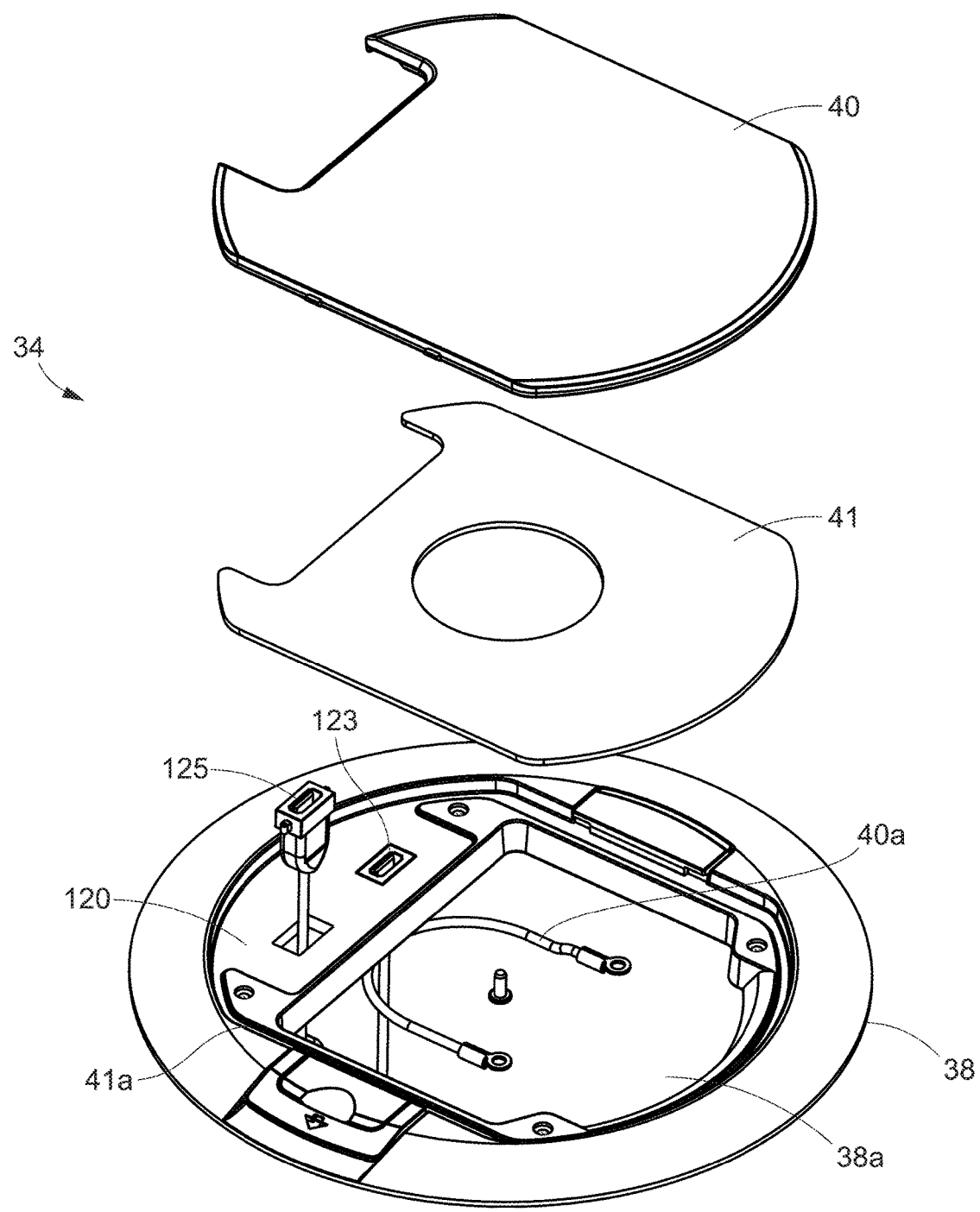
FIG. 5A. is an exploded perspective view of the cover assembly.
Figure 6:
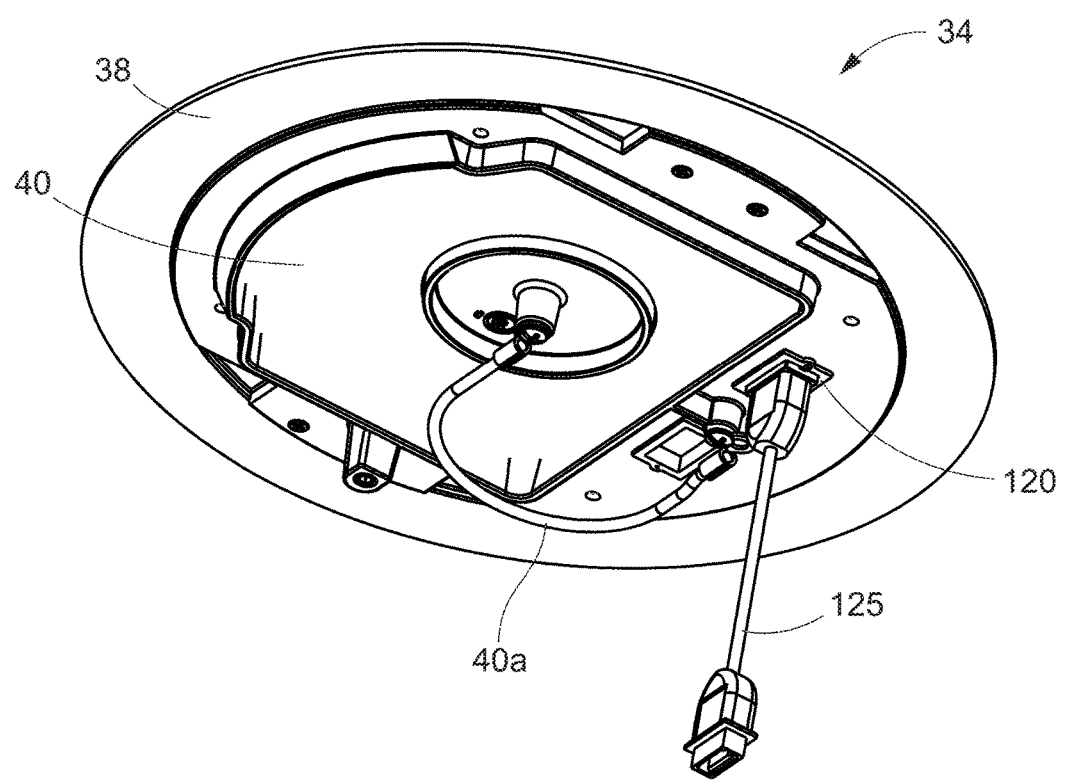
FIG. 6 is a bottom perspective view of the cover assembly.

With specific reference to FIGS. 5 and 6, the lid frame 38 may further include an electrical device portion 120 adapted to receive an electrical device wherein the electrical device is exposed when the lid is in the closed position. The electrical device portion 120 may have a planar section 122 in which one or more connection ports 123 are formed. The connection ports 123 may be USB or HDMI connection ports, for example. The ports 123 may be in the form of a jumper cable 125 that extends from the planer section 122 to an electrical device mounted in the frame 26. Alternatively, the electrical device portion 120 may include a knock out portion which, when removed, creates an opening for an electrical device such as a duplex outlet. This electrical device portion 120 and the electrical devices disposed therein are flush mounted and accessible even when the lid 40 is in the closed position as shown in FIG. 5. This permits a user to make a connection without having to expose the body interior 24. The lid 40 may be securably to the frame in two different positions. In a first position shown in FIG. 5, a lid cutout 43 may be positioned over the ports 123 to allow access to same. The lid 40 may also be secured in to the frame in a second position, 180 degrees offset from the first position. In the second position, the ports 123 are covered by the lid 40 and the cutout 43 provides an opening to the interior 24.

With reference to FIGS. 2, 10-12, the mounting frame 26 provides a structure to which electrical devices 12 may be secured. The mounting frame 26 is disposed in the body 22 between the upper 28 and lower 30 intumescent members. With specific reference to FIGS. 10, 10-12, the mounting frame 26 may have two end lobes 45 connected by a pair of dividers 46 that create three open sections 48. Each section 48 or gang may contain an electrical device 12 such as a power receptacle/outlet or a data connector/jack. The end lobes 45 may each have a rounded outer surface 45a which generally conforms to the inner surface of the body in which the mounting frame 26 is disposed. The end lobes 45 each include an electrical device mounting surface 49 including an opening 52 for receiving therein an electrical device 12. Therefore, the mounting frame can accommodate electrical devices 12 both at its ends on the mounting surfaces 49 and more centrally between the dividers 46.

A plurality of posts 50 extend upwardly from a mounting frame mounting surface 49. These posts 50 support thereon the upper intumescent member 28. The posts 50 also have mounting holes 51 therein to receive fasteners for securing the collar 44. The mounting frame 26 may be formed of a polymer non-heat conducting material such as polycarbonate. In the event of a fire condition, the mounting frame 26 will melt, and therefore, the mounting frame 26 will not form a heat sink or a conductor of heat through the poke-through body.

Figure 12:
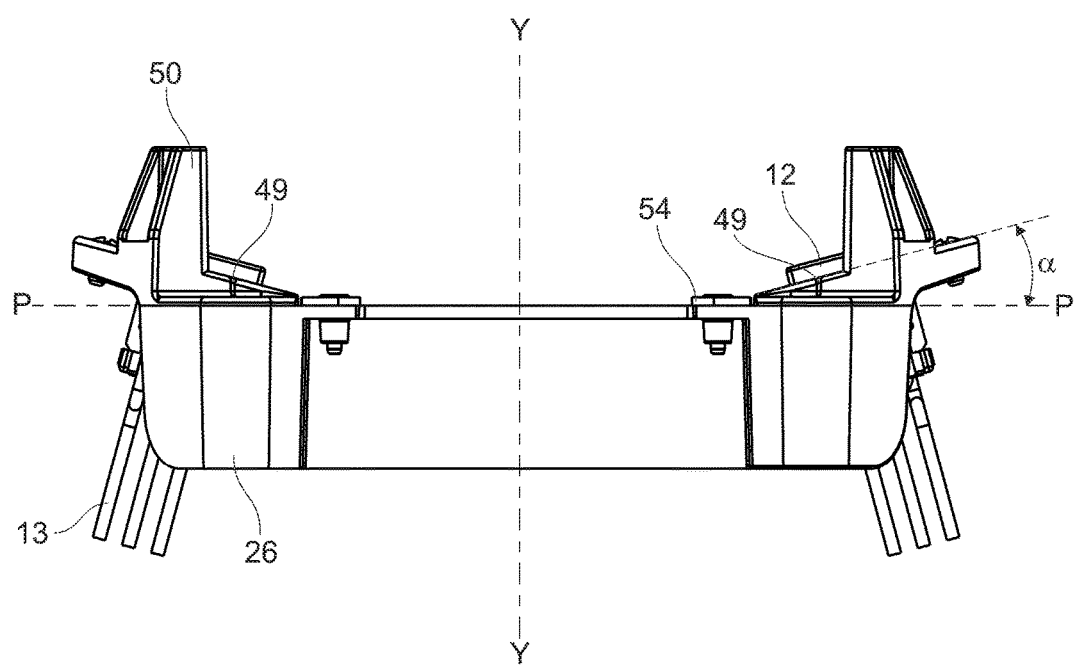
FIG. 12 is side elevational view of the electrical device mounting frame.

With reference to FIGS. 4 and 12, the body 22 may have a central vertical axis Y extending along the length of the body. The mounting frame may lie in a plane P extending along a transverse axis X which is perpendicular to the central axis Y. The mounting surfaces 49 are angularly offset with respect to the plane P toward the central axis Y of the body. In one embodiment, the degree angular offset, α, from the plane P is approximately 15 degrees. However, it is contemplated that the degree of offset could be in the range of 5 to 40 degrees. Because of this offset, when an electrical device 12 is secured to the angled mounting surfaces, the face is pitched toward the center of the interior. This positioning makes it easier for a user to plug and unplug a cord 130 (FIG. 7) into the electrical devices.

Figure 10:
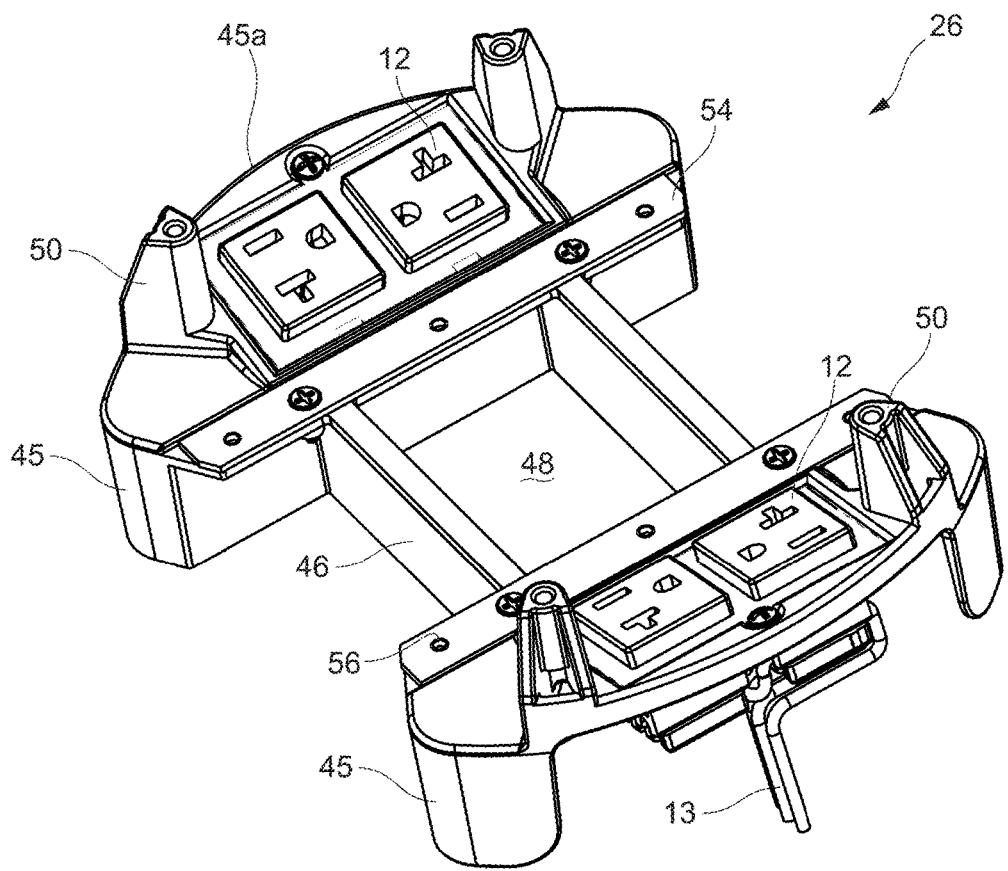
FIG. 10 is a perspective view of an electrical device mounting frame.
Figure 10A:
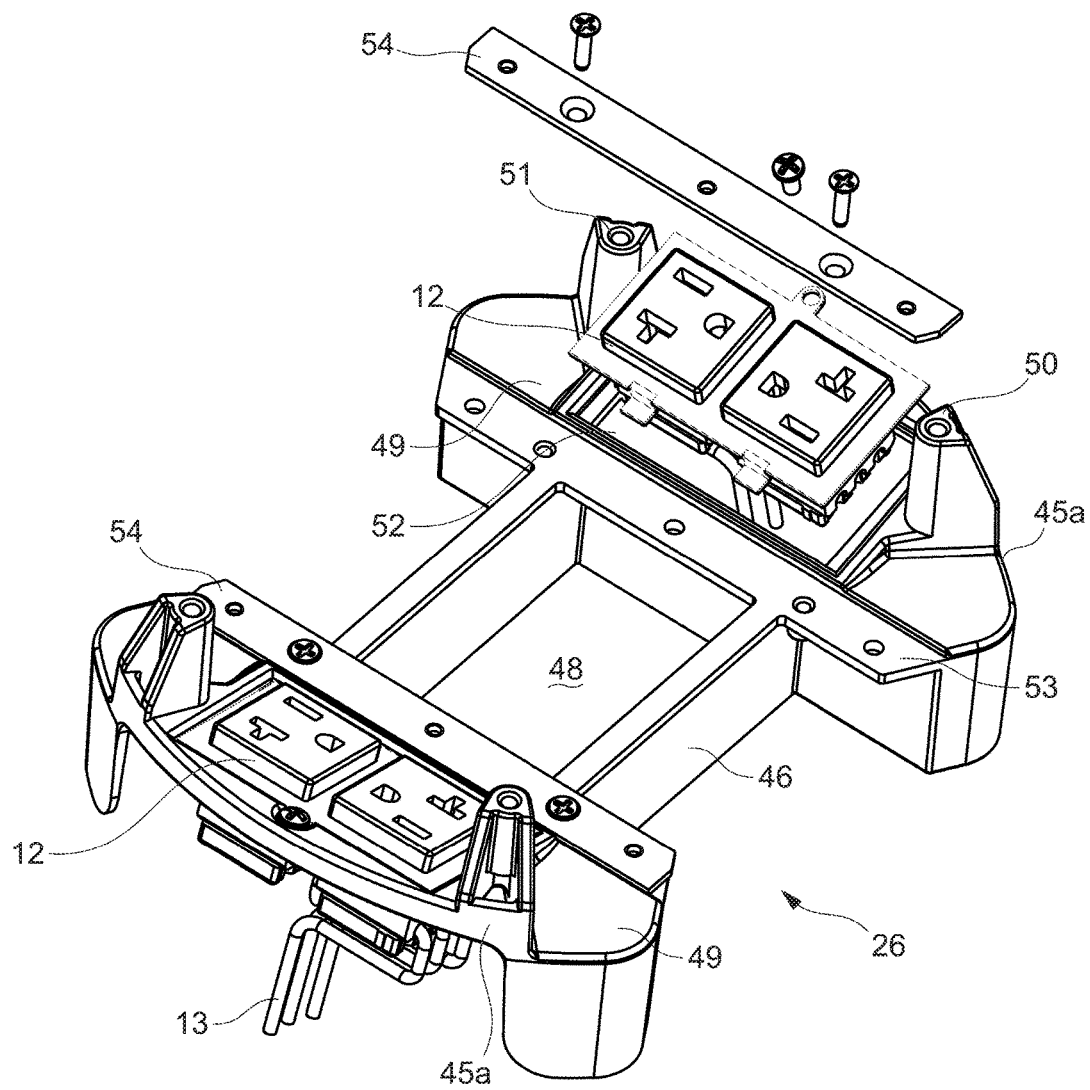
FIG. 10A is an exploded view of the mounting frame.
Figure 11:
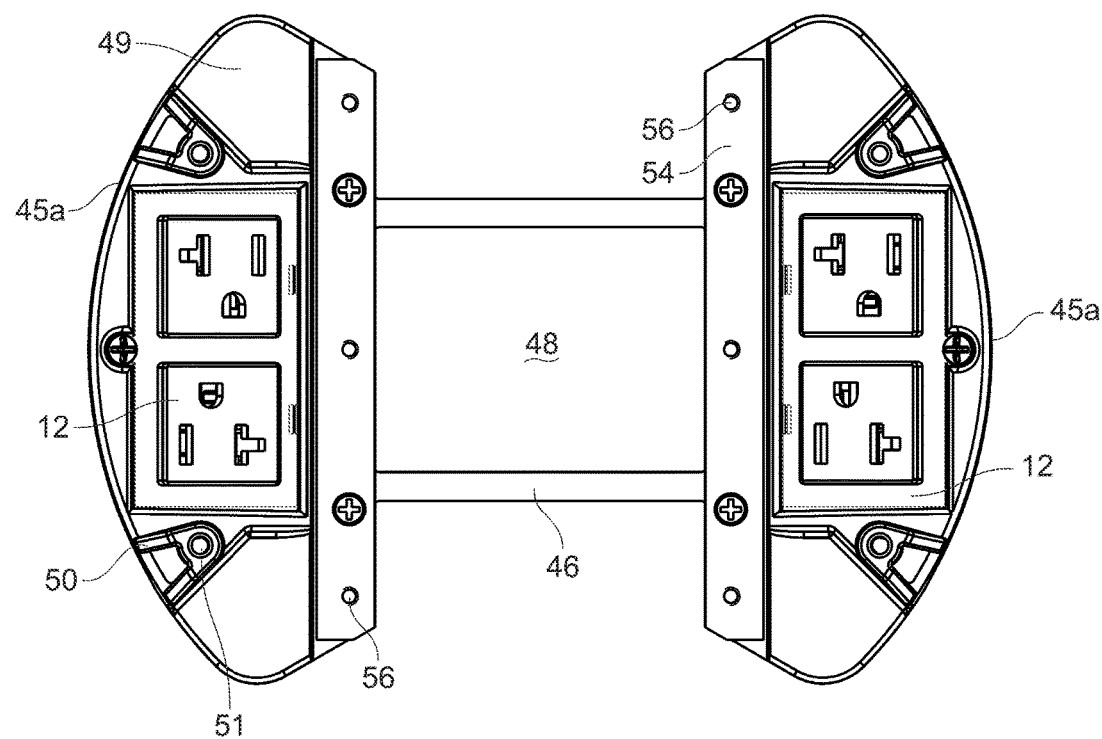
FIG. 11 is a top plane view of the electrical device mounting frame.

With further reference to FIGS. 10 and 10A, the mounting frame 26 may be formed of a polymer material. Using threaded fasteners to secure the electrical devices 12 thereto may result in the fasteners stripping out of the mounting frame material. In order to address this issue, the two mounting frame end lobes 45 may each include a metallic mounting plate 54 secured thereto. The metallic mounting plates 54 may be elongate members that provide attachment points 56 for the electrical devices 12 to be firmly secured to the mounting frame 26 between the mounting surfaces 49. The attachment points 56 may be in the form of threaded openings to which electrical devices 12 can be secured using standard fasteners. The mounting frame 26 may include recesses 53 to accommodate the mounting plates 54. Therefore, the top of the mounting plates 54 are flush with a top surface of the mounting frame. With the electrical devices 12 secured to the metallic plates 54, there is much less likelihood that threaded fasteners used for such a connection will strip the mounting frame material.

With reference to FIGS. 3 and 4A, faceplates 55 may be secured to the top of the electrical devices 12. The faceplates 55 may have openings and configurations that correspond to the particular electrical device 12 to which they are attached. For example, one faceplate 55 may have two openings for a duplex outlet and another may have a single opening for a GFCI outlet.

As shown in FIGS. 2-4, disposed above the mounting frame is the upper intumescent member 28 which may be in the form of a ring-shaped member. The upper intumescent member 28 sits on top of the body upper end 22a. The upper intumescent member 28 includes an annular body 58 including a pair of spaced arcuate shaped walls 60 extending upwardly therefrom. The walls 60 are offset from the body perimeter creating a ledge 62 on which the collar 44 sits. The upper intumescent member 28 may further include a pair of diametrically opposed lugs 64 extending from a bottom surface of the annular body 58 which fit in between the posts 50 extending from the mounting 26 frame. The upper intumescent member 28 is sized and located such that when exposed to heat of a predetermined degree, it will expand and flow to completely fill the space 66 between the mounting frame 26 and the cover assembly 34, and then block any openings extending through the poke-through. This prevents fire and hot gases from traveling though the poke-through. Fasteners 67 may extend through the collar 44 and through the upper intumescent member and threadedly engage tabs 69 (FIG. 3) extending inwardly from the body upper end 22a in order to secure the collar 44 and the upper intumescent member to the body 22.

Figure 3A:
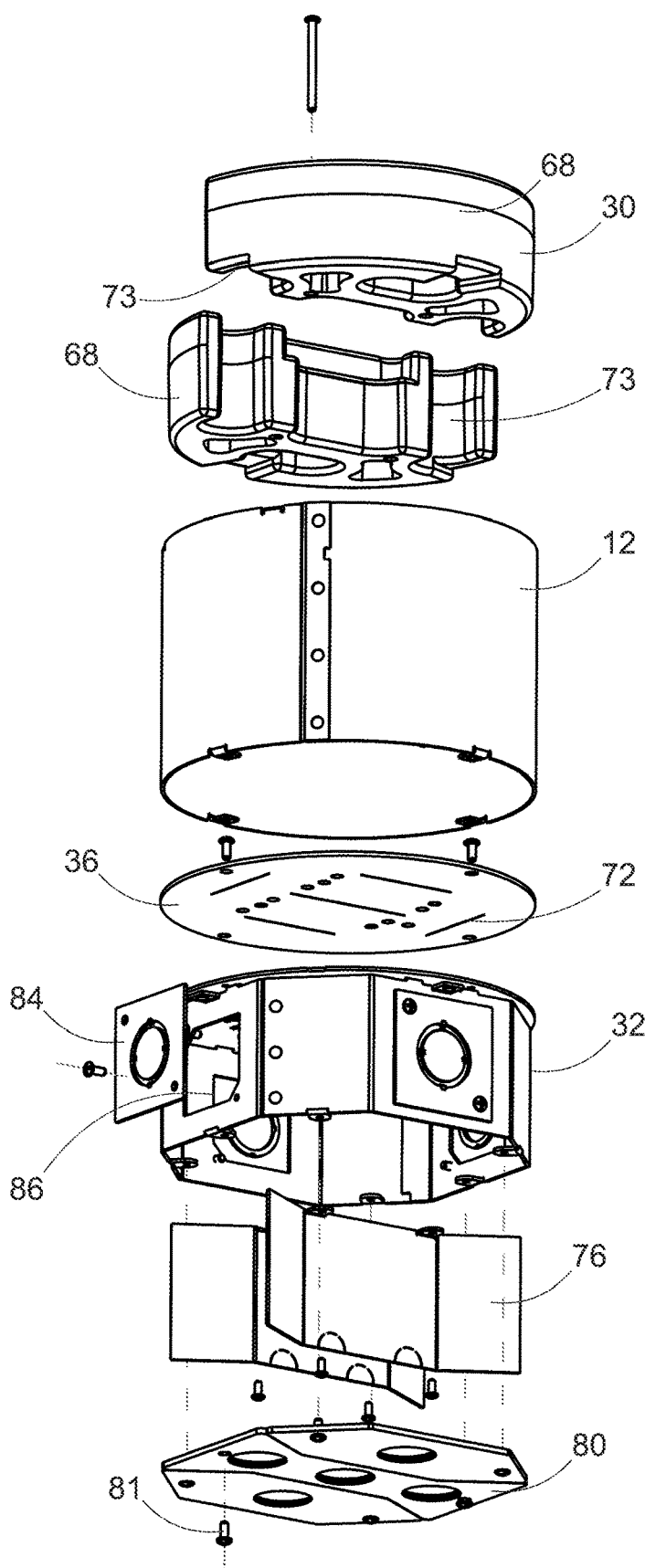
FIG. 3A is a perspective exploded view showing of the lower portion of the poke-through device.

With reference to FIGS. 2, 3A and 4, in a preferred embodiment, the mounting frame 26 may be supported on the lower intumescent member 30 which may be formed of intumescent material of a type known in the art. The lower intumescent member 30 may have a round shape conforming to the tubular body 22. The lower intumescent member 30 may be formed of two similarly formed semi-circular blocks 68 as shown in FIG. 3A. Each block 68 includes a passage 70 formed within to permit wiring to extend there through. Both blocks 68 have a recess 73 in a side wall such that when the two blocks 68 are placed together they form a center passage 75 to permit wiring to extend there through. In this manner, a plurality of electrical power wires extending through one passage remains spaced and electrically insulated from a plurality of data wires extending through the other passage 70. When the lower intumescent member 30 is sized and located such that when it is subjected to heat, such as from a fire condition, the lower intumescent member 30 will expand and flow to completely filling the space 71 (FIG. 4) defined between the mounting frame 26 and the electrical box 32. The intumescent material when expanded will also rise and fill around electrical devices 12. The passages 70 will cease to exist and the tube 22 will be completely blocked upon expansion of the lower intumescent member 30. Therefore, a fire stop will be created to prevent fire and hot gases from flowing through the poke through device 10.

With additional reference to FIGS. 2 and 3, in order to help retain the intumescent material of the lower intumescent member in the body 22, the gasket 36 is sandwiched between a top surface of the electrical box 32 and the body lower end 22b. Openings 79 exist in the electrical box 32 to allow the wiring therein to travel through the lower intumescent member 30 and be secured to the electrical devices 12. Upon a fire condition, wherein the upper 28 and lower 30 intumescent blocks are heated to a predetermined temperature, the material will begin to expand. The expanding intumescent material blocks through holes and openings extending through the body 22 of the poke-through in order to prevent a flow of air therethrough. The gasket 36 helps to restrict the intumescent material from expanding into the electrical box 32 and maintains the material within the metal portion of poke-through body 22 and contained within the concrete floor when a fire condition is present. In this way, none of the intumescent material leaves the 22 body of the poke-through and all of the openings within the body 22 can be properly sealed.

The gasket 36 is a flexible member and may be formed of a high-temperature fabric material coated with a high-temperature elastomeric material to create a fire and heat barrier. In one embodiment, the gasket 36 may be formed of silicon coated fiberglass cloth. The gasket 36 may include a plurality of slits 72 formed therein to allow power and data cables to pass from the electrical box 32 into the poke-through body 22. The gasket 36 is pliable and the material defining the slits 72 resiliently engages and urges against the wiring and maintains a close fit around the wires to keep the expanding intumescent material from falling into the electrical box during fire exposure. The gasket 36 may also include a plurality of openings 74 therein to accommodate mounting fasteners used to secure the electrical box 32 to the body 22.

With reference to FIGS. 1, 3, and 14-16E, the electrical box 32 which is located below the fire-resistant gasket 36 is attached directly to the lower end 22b of the poke-through body 22. The electrical box 32 may be secured to the lower portion of the body 22b with fasteners such as screws. The electrical box 32, which may be formed of a metallic material such as steel, acts as a fire shield during a fire. Accordingly, the electrical 32 box also acts as a barrier to prevent a fire or smoke and hot gasses from extending upwardly through the poke-through 10. The gasket 36 helps to seal the connection between the electrical box 32 and the body 22 to prevent fire or hot gasses from entering there between.

Figure 13:
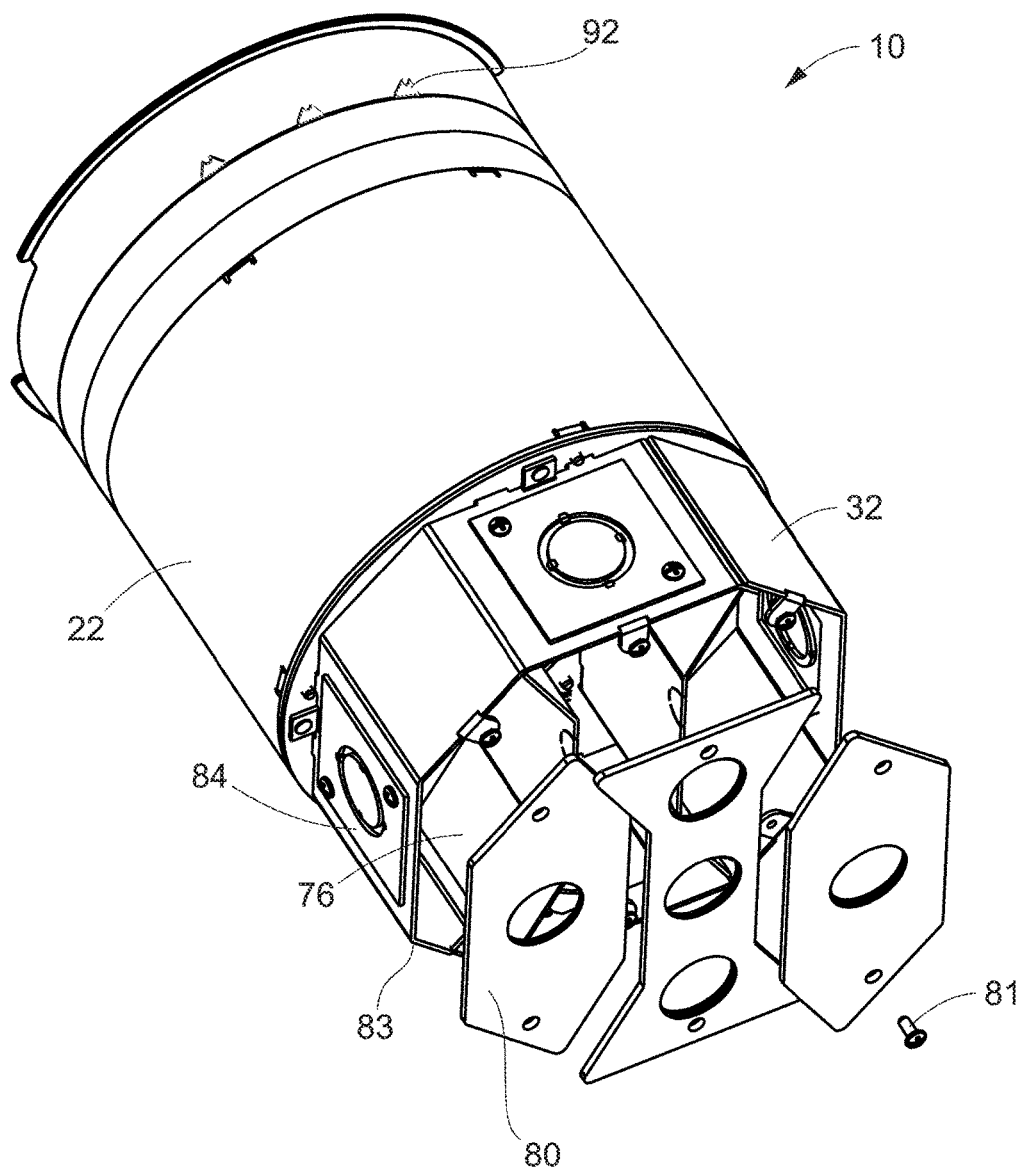
Figure 14:
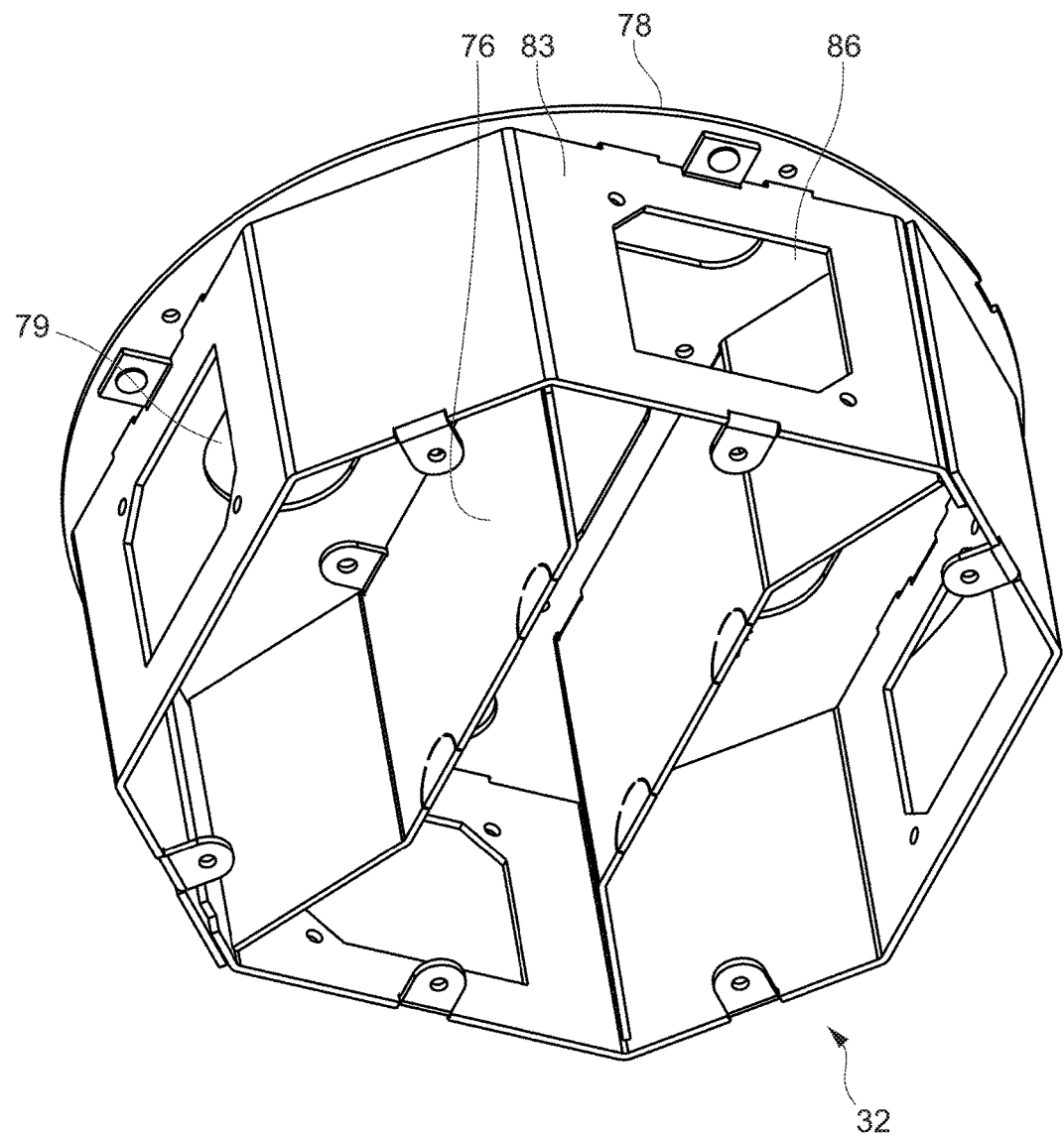
FIG. 14 is a bottom perspective view of the electrical box with the bottom removed.
Figure 15:
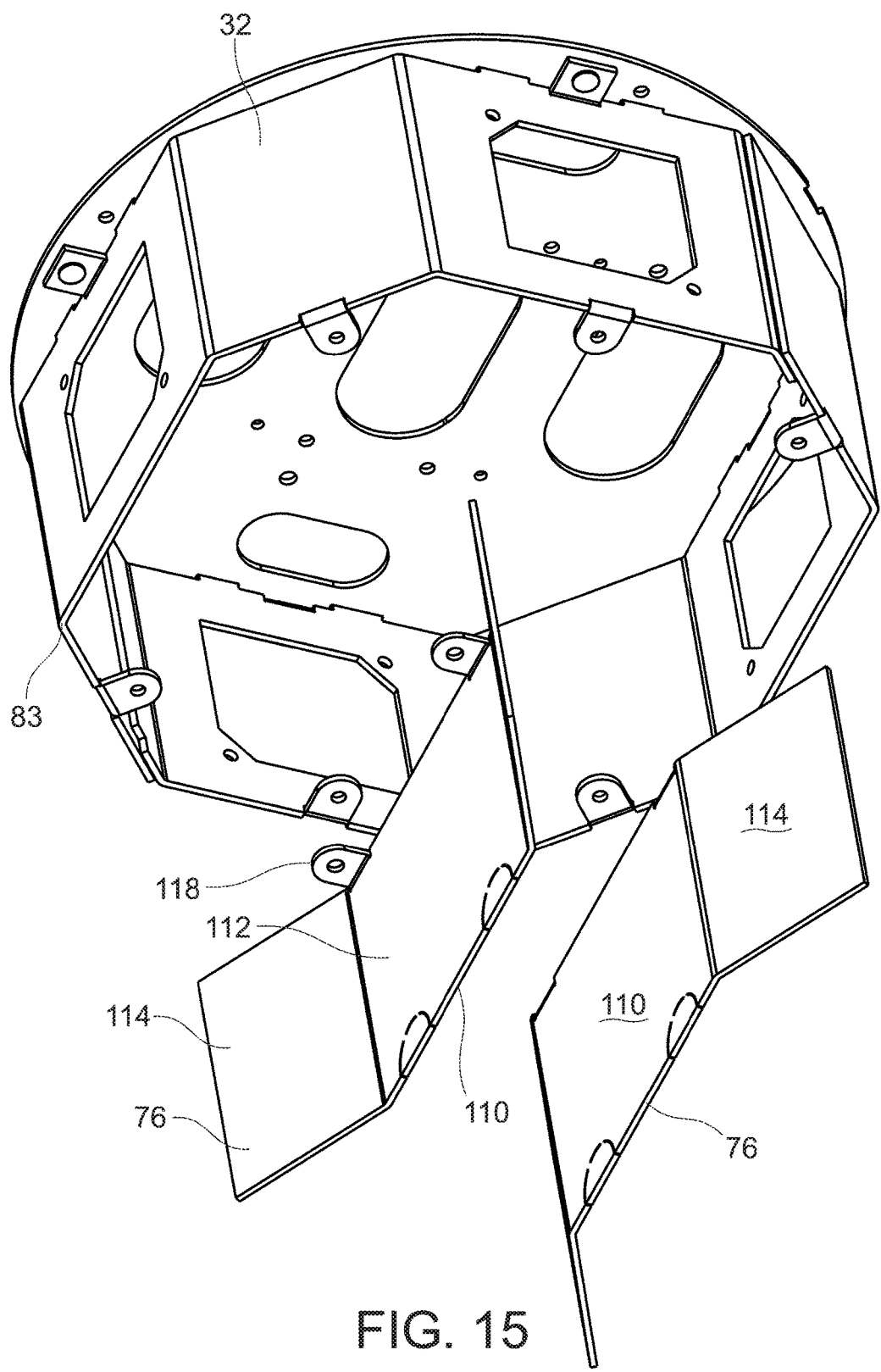
FIG. 15 is a partial exploded bottom perspective view of the electrical box showing dividers.

With further reference to FIG. 13, the electrical box 32 may have a metal top 78 having openings 79 therein. The top 78 provides support to the fire-resistant gasket 36 and also supports the lower intumescent member 30 disposed on top of the gasket 36. The lower wall of the electrical box may be formed of one or more removable metal plates 80. For example as shown in FIGS. 2 and 10, the box 32 is divided into three gangs 77, and the bottom of each gang is covered by a separate plate 80 secured to the box by fasteners 81. Each plate 80 may have a knock out to permit wiring to pass into the electrical box. The side walls 83 of the electrical box may include removable plates 84 covering openings 86 in order to facilitate connecting electrical wiring to the box. The side walls 83 of the box may include openings therein which can selectively be covered to accommodate wiring entering the box.

Figure 16A:
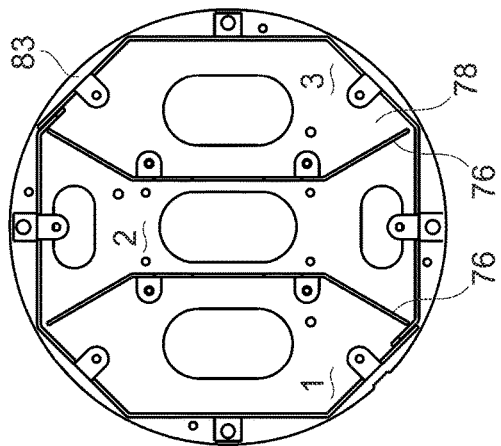
FIGS. 16A-E are bottom elevational views showing various interior configurations of the electrical box.
Figure 16B:
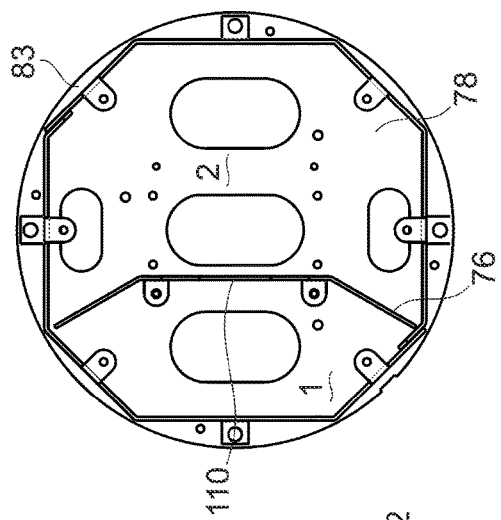
Figure 16C:
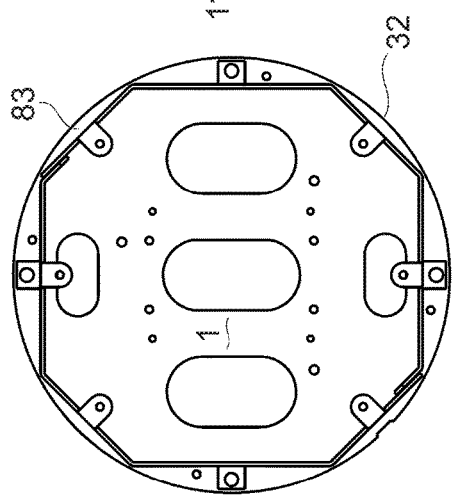
Figure 16D:
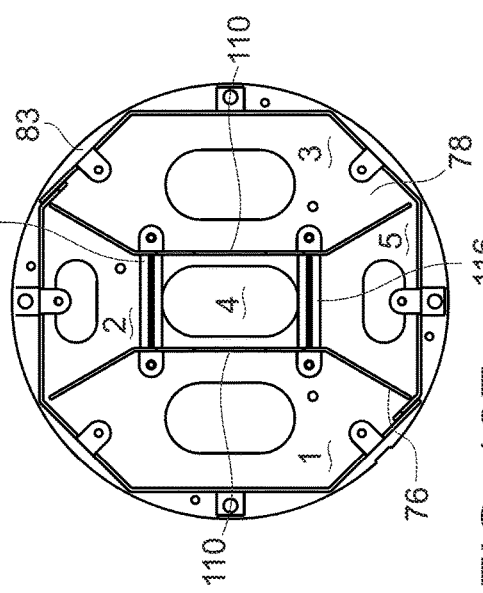
Figure 16E:
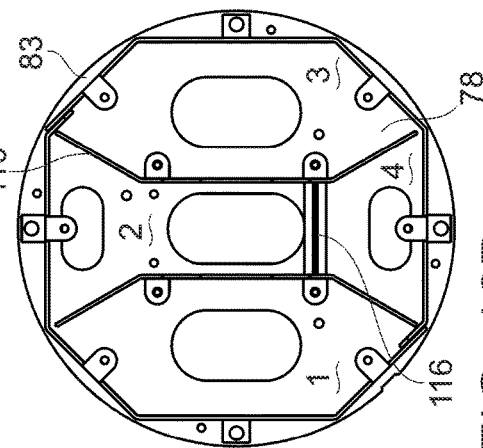

The electrical box may include dividers 76 within, shown in FIGS. 2, 14-16E, in order to permit power lines and data lines to be contained therein and separated. The dividers 76 may be removable to create a desired number of gangs or spaces 77. Two of the dividers 110 may be shallow U-shaped plates including a central section 112 and two ends 114 projecting at an obtuse angle form between the ends and the central section. Two other dividers 116 may be rectangular planar walls. Each of the dividers have tabs 118 extending therefrom to receive fasteners (not shown) so that the dividers 76 can be secured to the box top wall. By selecting which partitions to use, the box can have only one undivided opening as show in FIG. 16A, or 5 separate sections as shown in FIG. 16E. The dividers 76 permit the box to accommodate line power, data connections and low power applications.

With reference to FIG. 3, the poke through 10 preferably includes at least one retainer clip 90 to permit easy insertion of the poke through 10 into an interfloor receiving hole 14, and to substantially prevent subsequent withdrawal of the poke through 10 from the hole. Preferably, at least two opposed clips 90 are provided on the poke-through device 10, separated from each other by about 180 degrees. The clips are positioned between the upper intumescent member 28 and the collar 44. In one preferred embodiment, clips 90 are made of spring temper steel including fingers 92 that engage the side of the receiving hole 14. The clips 90 prevent the poke-through device from being removed from the hole 14 once it is installed.

While there have been described what is presently believed to be the preferred embodiments of the invention, those skilled in the art will realize that various changes and modifications may be made to the invention without departing from the invention, and it is intended to claim all such changes and modifications that fall within the scope of the invention.

What is claimed is:

1. A poke-through device for installation in a hole in a floor structure, the poke through device comprising:
    a body defining an interior, the body including a length bounded by an upper end and a lower end, the body including a central axis extending along its length;
    a mounting frame including a pair of opposed end lobes separated by at least one divider, one of the pair of lobes including a first electrical device mounting surface and the other of the pair of lobes including a second electrical device mounting surface, the first and second electrical mounting surfaces being angled toward the central axis, the first and second electrical device mounting surfaces each including an opening adapted to receive therein an electrical device;
    a first intumescent member disposed at the body upper end; and
    an electrical box secured to the body lower end.

2. The poke-through device as defined in claim 1, wherein the mounting frame forms a plane extending perpendicular to the central axis and the first and second electrical device mounting surfaces are angled with respect to the plane.

3. The poke-through device as defined in claim 2, wherein the first and second mounting surfaces are angled in the range of 5 to 40 degrees with respect to the plane.

4. The poke-through device as defined in claim 2, including a fire resistant gasket disposed between the electrical box and the body lower end, the gasket including openings therein to permit passage of wiring between the electrical box and the body.

5. The poke-through device as defined in claim 1, wherein the first intumescent member is disposed on the body, and wherein a portion of the first intumescent member extends above the body and a portion extends into the body.

6. The poke-through device as defined in claim 1, a second intumescent member is disposed on the body between the mounting frame and the body lower end, the second intumescent member including openings therein to permit wiring to pass therethrough.

7. The poke-through device as defined in claim 1, including a cover assembly secure above the body upper end.

8. The poke-through device as defined in claim 7, wherein the cover assembly includes a lid movable between an open and closed position, the cover assembly including an opening adapted to receive an electrical device wherein the electrical device is exposed when the lid is in the closed position.

9. The poke-through device as defined in claim 2, wherein the mounting frame has a pair of lobes connected to each other by at least one connecting member, and the first and second electrical device mounting surfaces are each disposed on one of the pair of lobes.

10. The poke-through device as defined in claim 9, including a plurality of metallic mounting plates secured to the mounting frame, the plurality of mounting plates adapted to secure an electrical device within the body.

11. The poke-through device as defined in claim 1, wherein the electrical box is formed of a metallic material, and includes a metallic top secured to the body lower end, the top engaging and supporting the gasket.

12. A poke-through device comprising: a body defining a body interior and including a length bounded by an upper end and a lower end, the body including a central axis extending along its length; a mounting frame is disposed in the body, the mounting frame including a mounting surface and a plurality of posts, the mounting surface and adapted to secure an electrical device within the body; a first intumescent member disposed at the body upper end and supported away from the mounting surface by the plurality of posts; and wherein the first intumescent member is a ring-shaped member having a plurality of lugs, the lugs being positioned between the plurality of posts; a second intumescent member disposed in the body between the mounting frame and the body lower end; a cover secured to the upper end, the cover including a frame defining an opening and a lid movable between an open and closed position wherein access to the body interior is provided when the lid is in the open position, the cover including an electrical device access port adapted to receive an electrical device wherein the electrical device access port is exposed when the lid is in the closed position; and an electrical box secured to the body lower end.

13. The poke-through device as defined in claim 12, including a fire resistant gasket disposed between the electrical box and the body lower end, the gasket including openings therein to permit passage of wiring between the electrical box and the body.

14. The poke-through device as defined in claim 13, wherein the gasket slit is adapted to closely conform to wiring passing there through to prevent expanding intumescent material from entering the electrical box when subjected to a fire condition.

15. The poke-through device as defined in claim 1, wherein the first intumescent member is sized such that upon a fire condition, the first intumescent member expands to fill a volume of the body between the mounting frame and the body upper end.

16. The poke-through device as defined in claim 15, wherein the second intumescent member is sized such that upon a fire condition, the second intumescent member expands to fill a volume of the body between the mounting frame and the electrical box.

17. The poke-through device as defined in claim 12, wherein the mounting frame is formed of a thermally non-conductive polymer material.

18. The poke-through device as defined in claim 17, wherein at least one metallic plate is secured to the mounting frame, the metallic plate including mounting points thereon adapted to secure an electrical device thereto.

19. A poke-through device comprising:
a body defining a body interior and including a length bounded by an upper end and a lower end, the body including a central axis extending along its length;
a mounting frame is disposed in the body and adapted to secure an electrical device within the body;
a first intumescent member disposed at the body upper end;
a second intumescent member disposed in the body between the mounting frame and the body lower end;
a cover secured to the upper end, the cover including a frame defining an opening and a lid movable between an open and closed position wherein access to the body interior is provided when the lid is in the open position, the cover including an electrical device access port adapted to receive an electrical device wherein the electrical device access port is exposed when the lid is in the closed position; and
an electrical box secured to the body lower end,
wherein the frame includes a pair of opposed end lobes separated by at least one divider, one of the pair of lobes including a first electrical device mounting surface and the other of the pair of lobes including a second electrical device mounting surface, the first and second electrical mounting surfaces being angled toward the central axis, the first and second electrical device mounting surfaces each including an opening for receiving an electrical device.

20. The poke-through device as defined in claim 19, wherein the mounting frame forms a plane extending perpendicular to the central axis and the first and second electrical device mounting surfaces are angled with respect to the plane.

21. The poke-through device as defined in claim 20, wherein the first and second mounting surfaces are angled in the range of 5 to 40 degrees with respect to the plane.

22. A poke-through device comprising:
a body defining an interior and including an upper end and a lower end and including a central axis extending between the upper and lower end;
a mounting frame including a pair of opposed mounting surfaces adapted to support a first electrical device, the mounting surfaces being spaced apart by a divider, the divider forming an opening to receive a second electrical device, a plurality of metallic mounting plates secured to the mounting frame, the plurality of mounting plates adapted to secure the second electrical device to the mounting frame between the pair of mounting surfaces, the pair of mounting surfaces is angled toward the central axis;
a first intumescent member disposed at the body upper end;
a second intumescent member disposed in the body interior between the mounting frame and the body lower end;
a metallic electrical box secured to the body lower end; and
a fire resistant gasket disposed between the electrical box and the body lower end, the gasket including slits therein to permit passage of wiring between the electrical box and the body and to retain the intumescent material in the body during a fire condition.

23. The poke-through device as defined in claim 22, wherein the second intumescent member includes a pair of blocks each including an opening therethrough adapted to permit wiring to extend between the electrical box and the mounting frame.

24. The poke-through device as defined in claim 23, wherein the pair of blocks each have a recess formed in a side wall wherein the pair of blocks form a central passage when placed in the body interior.

* * * * *